(12) United States Patent
Mukherjee et al.

(10) Patent No.: US 10,567,793 B2
(45) Date of Patent: Feb. 18, 2020

(54) ADAPTIVE OVERLAPPED BLOCK PREDICTION IN VARIABLE BLOCK SIZE VIDEO CODING

(71) Applicant: GOOGLE LLC, Mountain View, CA (US)

(72) Inventors: Debargha Mukherjee, Cupertino, CA (US); Yue Chen, Goleta, CA (US)

(73) Assignee: GOOGLE LLC, Mountain View, CA (US)

( * ) Notice: Subject to any disclaimer, the term of this patent is extended or adjusted under 35 U.S.C. 154(b) by 492 days.

(21) Appl. No.: 15/174,223

(22) Filed: Jun. 6, 2016

(65) Prior Publication Data

US 2017/0353735 A1 Dec. 7, 2017

(51) Int. Cl.
*H04N 19/567* (2014.01)
*H04N 19/176* (2014.01)
(Continued)

(52) U.S. Cl.
CPC ......... *H04N 19/567* (2014.11); *H04N 19/107* (2014.11); *H04N 19/119* (2014.11);
(Continued)

(58) Field of Classification Search
None
See application file for complete search history.

(56) References Cited

U.S. PATENT DOCUMENTS

| | | | |
|---|---|---|---|
| 5,602,593 A * | 2/1997 | Katto | H04N 19/51 |
| | | | 348/699 |
| 2005/0078755 A1* | 4/2005 | Woods | H04N 19/119 |
| | | | 375/240.24 |

(Continued)

FOREIGN PATENT DOCUMENTS

| | | |
|---|---|---|
| CN | 1926868 A | 3/2007 |
| WO | 2011128023 A1 | 10/2011 |
| WO | 2015081888 A1 | 6/2015 |

OTHER PUBLICATIONS

Park et al., "Adaptive Windowing Technique for Variable Block-Size Motion Compensation", Visual Communicatons and Image Processing, SPIE vol. 5308, Jan. 20, 2004, pp. 509-519.

(Continued)

*Primary Examiner* — Lindsay J Uhl
(74) *Attorney, Agent, or Firm* — Young Basile Hanlon & MacFarlane, P.C.

(57) ABSTRACT

Encoding frames of a video stream may include encoding a current block of a current frame, generating a base prediction block for the current block based on current prediction parameters associated with the current block, identifying adjacent prediction parameters used for encoding previously encoded adjacent blocks that are adjacent to the current block. At least one side of the current block is adjacent to two or more of the previously encoded adjacent blocks. The encoding may include determining overlap regions in the current block, each of the overlap regions corresponding to a respective previously encoded adjacent block, generating an overlapped prediction of pixel values for each of the overlap regions according to a weighted function of the base prediction and a prediction based on the adjacent prediction parameters. The weighted function may be based on a difference between the current prediction parameters and the adjacent prediction parameters.

16 Claims, 9 Drawing Sheets

(51) Int. Cl.
*H04N 19/119* (2014.01)
*H04N 19/107* (2014.01)
*H04N 19/157* (2014.01)
*H04N 19/182* (2014.01)
*H04N 19/583* (2014.01)

(52) U.S. Cl.
CPC ......... *H04N 19/157* (2014.11); *H04N 19/176* (2014.11); *H04N 19/182* (2014.11); *H04N 19/583* (2014.11)

(56) References Cited

U.S. PATENT DOCUMENTS

| | | | | |
|---|---|---|---|---|
| 2010/0215101 | A1* | 8/2010 | Jeon | H04N 19/105 375/240.12 |
| 2011/0142132 | A1* | 6/2011 | Tourapis | H04N 19/597 375/240.16 |
| 2013/0022124 | A1* | 1/2013 | Sekiguchi | H04N 19/105 375/240.16 |
| 2015/0163509 | A1* | 6/2015 | Hsu | H04N 19/583 375/240.16 |
| 2016/0330475 | A1 | 11/2016 | Zhou | |
| 2017/0353733 | A1* | 12/2017 | Mukherjee | H04N 19/176 |
| 2018/0184118 | A1* | 6/2018 | Mukherjee | H04N 19/583 |

OTHER PUBLICATIONS

Wang et al., "Coding mode adapted overlapped block motion compensation in H.264", IMACS Multiconference on "Computational Engineering in Systems Applications" (CESA), Oct. 4-6, 2006, pp. 1665-1668.

Orchard et al., "Overlapped Block Motion Compensation: An Estimation-Theoretic Approach", 8395 IEEE Transactions on Image Processing, vol. 3, No. 5, Sep. 3, 1994, pp. 693-699.

Guo et al., "CE2: Overlapped Block Motion Compensation for 2NxN and Nx2N Motion Partitions", JCT-VC of ITU-T SG16 WP3 and ISO/IEC, JTC1/SC29/WG11, 6th Meeting: Torino, Jul. 14-22, 2011, 7 pgs.

Chen et al., "Implementation of Multiple Macroblock Mode Overlapped Block Motion Compensation for Wavelet Video Coding", Circuits Systems Signal Processing, vol. 26, No. 1, Feb. 1, 2007, pp. 55-67.

Bankoski, et al., "Technical Overview of VP8, An Open Source Video Codec for the Web", Jul. 11, 2011, 6 pp.

Bankoski et al., "VP8 Data Format and Decoding Guide", Independent Submission RFC 6389, Nov. 2011, 305 pp.

Bankoski et al., "VP8 Data Format and Decoding Guide draft-bankoski-vp8-bitstream-02", Network Working Group, Internet-Draft, May 18, 2011, 288 pp.

Series H: Audiovisual and Multimedia Systems, Coding of moving video: Implementors Guide for H.264: Advanced video coding for generic audiovisual services, International Telecommunication Union, Jul. 30, 2010, 15 pp.

"Introduction to Video Coding Part 1: Transform Coding", Mozilla, Mar. 2012, 171 pp.

"Overview VP7 Data Format and Decoder", Version 1.5, On2 Technologies, Inc., Mar. 28, 2005, 65 pp.

Series H: Audiovisual and Multimedia Systems, Infrastructure of audiovisual services—Coding of moving video, Advanced video coding for generic audiovisual services, International Telecommunication Union, Version 11, Mar. 2009. 670 pp.

Series H: Audiovisual and Multimedia Systems, Infrastructure of audiovisual services—Coding of moving video, Advanced video coding for generic audiovisual services, International Telecommunication Union, Version 12, Mar. 2010, 676 pp.

Series H: Audiovisual and Multimedia Systems, Infrastructure of audiovisual services—Coding of moving video, Amendment 2: New profiles for professional applications, International Telecommunication Union, Apr. 2007, 75 pp.

Series H: Audiovisual and Multimedia Systems, Infrastructure of audiovisual services—Coding of moving video, Advanced video coding for generic audiovisual services, Version 8, International Telecommunication Union, Nov. 1, 2007, 564 pp.

Series H: Audiovisual and Multimedia Systems, Infrastructure of audiovisual services—Coding of moving video, Advanced video coding for generic audiovisual services, Amendment 1: Support of additional colour spaces and removal of the High 4:4:4 Profile, International Telecommunication Union, Jun. 2006, 16 pp.

Series H: Audiovisual and Multimedia Systems, Infrastructure of audiovisual services—Coding of moving video, Advanced video coding for generic audiovisual services, Version 1, International Telecommunication Union, May 2003, 282 pp.

Series H: Audiovisual and Multimedia Systems, Infrastructure of audiovisual services—Coding of moving video, Advanced video coding for generic audiovisual services, Version 3, International Telecommunication Union, Mar. 2005, 343 pp.

"VP6 Bitstream and Decoder Specification", Version 1.02, On2 Technologies, Inc., Aug. 17, 2006, 88 pp.

"VP6 Bitstream and Decoder Specification", Version 1.03, On2 Technologies, Inc., Oct. 29, 2007, 95 pp.

"VP8 Data Format and Decoding Guide, WebM Project", Google On2, Dec. 1, 2010, 103 pp.

Liao et al., "A low complexity architecture for video coding with overlapped block motion compensation," 2010 17th IEEE International Conference on Image Processing (ICIP), Hong Kong, 2010, pp. 2041-2044.

Wang et al., "Coding mode adapted overlapped block motion compensation in H.264", IMACS Multiconference on Computational Engineering in Systems Applications (CESA), Oct. 4-6, 2006, Beijing, China, pp. 1665-1668.

Park et al., "Adaptive Windowing Technique for Variable Block-Size Motion Compensation", Visual Communications and Image Processing, San Jose, Jan. 20, 2004, Proceedings of SPIE/IS&T Electronic Imaging, SPIE vol. 5308, pp. 509-519.

Orchard et al., "Overlapped Block Motion Compensation: An Estimation-Theoretic Approach", IEEE Transactions on Image Processing, IEEE, Piscataway, NJ, US, Sep. 1, 1994, pp. 693-699.

Guo et al., "CE2:Overlapped Block Motion Compensation for 2NxN and Nx2N Motion Partitions", Joint Collaborative Team on Video Coding (JCT-VC) of ITU-T SG16 WP3 and ISO/IEC JTC1/SC29/WG11, 6th Meeting, Torino, Jul. 14-22, 2011, 7 pgs.

Chen et al., "Implementation of Multiple Macroblock Mode Overlapped Block Motion Compensation for Wavelet Video Coding", Circuits, Systems & Signal Processing, Birkhäuser-Verlag, BO, vol. 26, No. 1, Feb. 1, 2007, pp. 55-67.

Combined Search and Examination Report in corresponding foreign Application No. GB1621884.4, dated Jun. 8, 2017.

* cited by examiner

ADAPTIVE OVERLAPPED BLOCK PREDICTION IN VARIABLE BLOCK SIZE VIDEO CODING

BACKGROUND

Digital video can be used, for example, for remote business meetings via video conferencing, high definition video entertainment, video advertisements, or sharing of user-generated videos. Due to the large amount of data involved in video data, high performance compression is needed for transmission and storage. Various approaches have been proposed to reduce the amount of data in video streams, including compression and other encoding and decoding techniques.

SUMMARY

This application relates to encoding and decoding of video stream data for transmission or storage. Disclosed herein are aspects of systems, methods, and apparatuses related to adaptive overlapped block prediction in variable block size video coding.

An aspect is a method for encoding frames of a video stream may include encoding a current block of a current frame, generating a base prediction block for the current block based on current prediction parameters associated with the current block, identifying adjacent prediction parameters used for encoding previously encoded adjacent blocks that are adjacent to the current block. At least one side of the current block is adjacent to two or more of the previously encoded adjacent blocks. The encoding may include determining overlap regions in the current block, each of the overlap regions corresponding to a respective previously encoded adjacent block, generating an overlapped prediction of pixel values for each of the overlap regions according to a weighted function of the base prediction and a prediction based on the adjacent prediction parameters. The weighted function may be based on a difference between the current prediction parameters and the adjacent prediction parameters.

Another aspect is a method of encoding a current block in a current frame of a video stream, including determining a first overlap region within the current block and adjacent to a previously encoded first adjacent block, at least one side of the current block being adjacent to two or more of the previously encoded adjacent blocks, and generating an overlapped prediction of pixel values in the first overlap region as a weighted function of a first prediction using first prediction parameters of the current frame, and a second prediction using second prediction parameters of the first adjacent block, the weighted function being adaptable by a function of a difference between the first prediction parameters and the second prediction parameters.

Another aspect is a method of encoding a current block of a current frame in a plurality of frames of a video stream, including generating a first prediction block of pixel values in the current block based on a first prediction using first prediction parameters, defining an overlap region within the current block and adjacent to an adjacent block among a plurality of previously encoded blocks having variable block sizes, at least one side of the current block being adjacent to two or more of the previously encoded blocks, and generating an updated prediction of pixel values for each pixel within the overlap region, the updated prediction being a weighted function of the first prediction and a second prediction, the second prediction being based on the second prediction parameters. The weighted function may be adaptable by a function of a difference between the first prediction parameters and the second prediction parameters.

Variations in these and other aspects will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

Video compression schemes may include breaking each image, or frame, into smaller portions, such as blocks, and generating an output bitstream using techniques to limit the information included for each block in the output. An encoded bitstream can be decoded to re-create the source images from the limited information. In some implementations, the information included for each block in the output may be limited by reducing spatial redundancy, reducing temporal redundancy, or a combination thereof. For example, temporal or spatial redundancies may be reduced by predicting a frame based on information available to both the encoder and decoder, and including information representing a difference, or residual, between the predicted frame and the original frame in an encoded video stream.

In some implementations, a frame may be divided into blocks of variable sizes, pixel values of each block may be predicted using previously coded information, and prediction parameters and residual data of each block may be encoded as output. A decoder may receive the prediction parameters and residual data in the compressed bitstream and may reconstruct the frame, which may include predicting blocks based on previously decoded image data.

Overlapped prediction can improve prediction of a block by using prediction information from adjacent blocks. In some implementations, the prediction block size of the adjacent blocks may vary among the adjacent blocks and may be different from the prediction block size of a current block. Respective overlap regions within the current block can be identified corresponding to respective adjacent blocks, and an overlapped prediction can be determined for respective overlap regions based on prediction parameters from the corresponding adjacent blocks. In some implementations, overlapped prediction may be optimized by adapting the size of each overlap region in the current block, such as according to comparison of prediction parameters of the adjacent block and prediction parameters of the current block.

Figure 1:
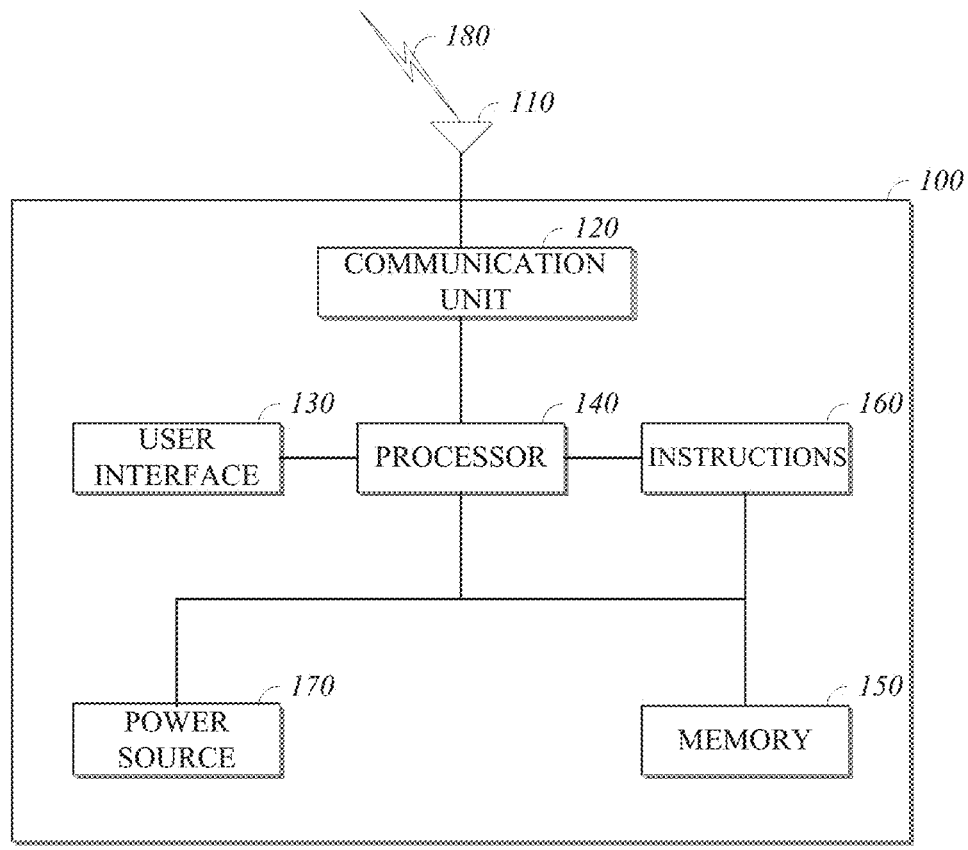
FIG. 1 is a diagram of a computing device in accordance with implementations of this disclosure.

FIG. 1 is a diagram of a computing device 100 in accordance with implementations of this disclosure. A computing device 100 can include a communication interface 110, a communication unit 120, a user interface (UI) 130, a processor 140, a memory 150, instructions 160, a power source 170, or any combination thereof. As used herein, the term "computing device" includes any unit, or combination of units, capable of performing any method, or any portion or portions thereof, disclosed herein.

The computing device 100 may be a stationary computing device, such as a personal computer (PC), a server, a workstation, a minicomputer, or a mainframe computer; or a mobile computing device, such as a mobile telephone, a personal digital assistant (PDA), a laptop, or a tablet PC. Although shown as a single unit, any one or more element of the communication device 100 can be integrated into any number of separate physical units. For example, the UI 130 and processor 140 can be integrated in a first physical unit and the memory 150 can be integrated in a second physical unit.

The communication interface 110 can be a wireless antenna, as shown, a wired communication port, such as an Ethernet port, an infrared port, a serial port, or any other wired or wireless unit capable of interfacing with a wired or wireless electronic communication medium 180.

The communication unit 120 can be configured to transmit or receive signals via a wired or wireless medium 180. For example, as shown, the communication unit 120 is operatively connected to an antenna configured to communicate via wireless signals. Although not explicitly shown in FIG. 1, the communication unit 120 can be configured to transmit, receive, or both via any wired or wireless communication medium, such as radio frequency (RF), ultra violet (UV), visible light, fiber optic, wire line, or a combination thereof. Although FIG. 1 shows a single communication unit 120 and a single communication interface 110, any number of communication units and any number of communication interfaces can be used.

The UI 130 can include any unit capable of interfacing with a user, such as a virtual or physical keypad, a touchpad, a display, a touch display, a speaker, a microphone, a video camera, a sensor, or any combination thereof. The UI 130 can be operatively coupled with the processor, as shown, or with any other element of the communication device 100, such as the power source 170. Although shown as a single unit, the UI 130 may include one or more physical units. For example, the UI 130 may include an audio interface for performing audio communication with a user, and a touch display for performing visual and touch based communication with the user. Although shown as separate units, the communication interface 110, the communication unit 120, and the UI 130, or portions thereof, may be configured as a combined unit. For example, the communication interface 110, the communication unit 120, and the UI 130 may be implemented as a communications port capable of interfacing with an external touchscreen device.

The processor 140 can include any device or system capable of manipulating or processing a signal or other information now-existing or hereafter developed, including optical processors, quantum processors, molecular processors, or a combination thereof. For example, the processor 140 can include a special purpose processor, a digital signal processor (DSP), a plurality of microprocessors, one or more microprocessor in association with a DSP core, a controller, a microcontroller, an Application Specific Integrated Circuit (ASIC), a Field Programmable Gate Array (FPGA), a programmable logic array, programmable logic controller, microcode, firmware, any type of integrated circuit (IC), a state machine, or any combination thereof. As used herein, the term "processor" includes a single processor or multiple processors. The processor can be operatively coupled with the communication interface 110, communication unit 120, the UI 130, the memory 150, the instructions 160, the power source 170, or any combination thereof.

The memory 150 can include any non-transitory computer-usable or computer-readable medium, such as any tangible device that can, for example, contain, store, communicate, or transport the instructions 160, or any information associated therewith, for use by or in connection with the processor 140. The non-transitory computer-usable or computer-readable medium can be, for example, a solid state drive, a memory card, removable media, a read only memory (ROM), a random access memory (RAM), any type of disk including a hard disk, a floppy disk, an optical disk, a magnetic or optical card, an application specific integrated circuits (ASICs), or any type of non-transitory media suitable for storing electronic information, or any combination thereof. The memory 150 can be connected to, for example, the processor 140 through, for example, a memory bus (not explicitly shown).

The instructions 160 can include directions for performing any method, or any portion or portions thereof, disclosed herein. The instructions 160 can be realized in hardware, software, or any combination thereof. For example, the instructions 160 may be implemented as information stored in the memory 150, such as a computer program, that may be executed by the processor 140 to perform any of the respective methods, algorithms, aspects, or combinations thereof, as described herein. The instructions 160, or a portion thereof, may be implemented as a special purpose processor, or circuitry, that can include specialized hardware for carrying out any of the methods, algorithms, aspects, or combinations thereof, as described herein. Portions of the instructions 160 can be distributed across multiple processors on the same machine or different machines or across a network such as a local area network, a wide area network, the Internet, or a combination thereof.

The power source 170 can be any suitable device for powering the communication device 110. For example, the power source 170 can include a wired power source; one or more dry cell batteries, such as nickel-cadmium (NiCd), nickel-zinc (NiZn), nickel metal hydride (NiMH), lithium-ion (Li-ion); solar cells; fuel cells; or any other device capable of powering the communication device 110. The communication interface 110, the communication unit 120, the UI 130, the processor 140, the instructions 160, the memory 150, or any combination thereof, can be operatively coupled with the power source 170.

Although shown as separate elements, the communication interface 110, the communication unit 120, the UI 130, the processor 140, the instructions 160, the power source 170, the memory 150, or any combination thereof can be integrated in one or more electronic units, circuits, or chips.

Figure 2:
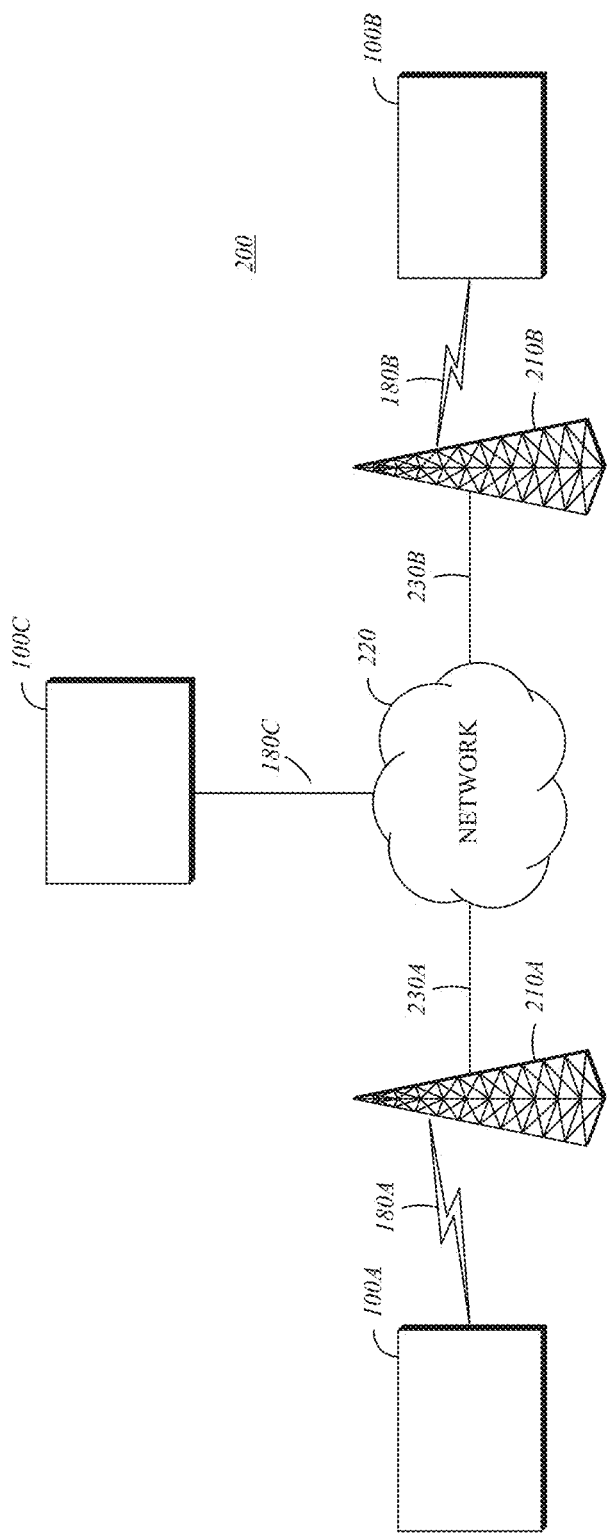
FIG. 2 is a diagram of a computing and communications system in accordance with implementations of this disclosure.

FIG. 2 is a diagram of a computing and communications system 200 in accordance with implementations of this disclosure. The computing and communications system 200 may include one or more computing and communication devices 100A/100B/100C, one or more access points 210A/210B, one or more networks 220, or a combination thereof. For example, the computing and communication system 200 can be a multiple access system that provides communication, such as voice, data, video, messaging, broadcast, or a combination thereof, to one or more wired or wireless communicating devices, such as the computing and communication devices 100A/100B/100C. Although, for simplicity, FIG. 2 shows three computing and communication devices 100A/100B/100C, two access points 210A/210B, and one network 220, any number of computing and communication devices, access points, and networks can be used.

A computing and communication device 100A/100B/100C can be, for example, a computing device, such as the computing device 100 shown in FIG. 1. For example, as shown the computing and communication devices 100A/100B may be user devices, such as a mobile computing device, a laptop, a thin client, or a smartphone, and computing and the communication device 100C may be a server, such as a mainframe or a cluster. Although the computing and communication devices 100A/100B are described as user devices, and the computing and communication device 100C is described as a server, any computing and communication device may perform some or all of the functions of a server, some or all of the functions of a user device, or some or all of the functions of a server and a user device.

Each computing and communication device 100A/100B/100C can be configured to perform wired or wireless communication. For example, a computing and communication device 100A/100B/100C can be configured to transmit or receive wired or wireless communication signals and can include a user equipment (UE), a mobile station, a fixed or mobile subscriber unit, a cellular telephone, a personal computer, a tablet computer, a server, consumer electronics, or any similar device. Although each computing and communication device 100A/100B/100C is shown as a single unit, a computing and communication device can include any number of interconnected elements.

Each access point 210A/210B can be any type of device configured to communicate with a computing and communication device 100A/100B/100C, a network 220, or both via wired or wireless communication links 180A/180B/180C. For example, an access point 210A/210B can include a base station, a base transceiver station (BTS), a Node-B, an enhanced Node-B (eNode-B), a Home Node-B (HNode-B), a wireless router, a wired router, a hub, a relay, a switch, or any similar wired or wireless device. Although each access point 210A/210B is shown as a single unit, an access point can include any number of interconnected elements.

The network 220 can be any type of network configured to provide services, such as voice, data, applications, voice over internet protocol (VoIP), or any other communications protocol or combination of communications protocols, over a wired or wireless communication link. For example, the network 220 can be a local area network (LAN), wide area network (WAN), virtual private network (VPN), a mobile or cellular telephone network, the Internet, or any other means of electronic communication. The network can use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computing and communication devices 100A/100B/100C can communicate with each other via the network 220 using one or more a wired or wireless communication links, or via a combination of wired and wireless communication links. For example, as shown the computing and communication devices 100A/100B can communicate via wireless communication links 180A/180B, and computing and communication device 100C can communicate via a wired communication link 180C. Any of the computing and communication devices 100A/100B/100C may communicate using any wired or wireless communication link, or links. For example, a first computing and communication device 100A can communicate via a first access point 210A using a first type of communication link, a second computing and communication device 100B can communicate via a second access point 210B using a second type of communication link, and a third computing and communication device 100C can communicate via a third access point (not shown) using a third type of communication link. Similarly, the access points 210A/210B can communicate with the network 220 via one or more types of wired or wireless communication links 230A/230B. Although FIG. 2 shows the computing and communication devices 100A/100B/100C in communication via the network 220, the computing and communication devices 100A/100B/100C can communicate with each other via any number of communication links, such as a direct wired or wireless communication link.

Other implementations of the computing and communications system 200 are possible. For example, the network 220 can be an ad-hock network and can omit one or more of the access points 210A/210B. The computing and communications system 200 may include devices, units, or elements not shown in FIG. 2. For example, the computing and communications system 200 may include many more communicating devices, networks, and access points.

Figure 3:
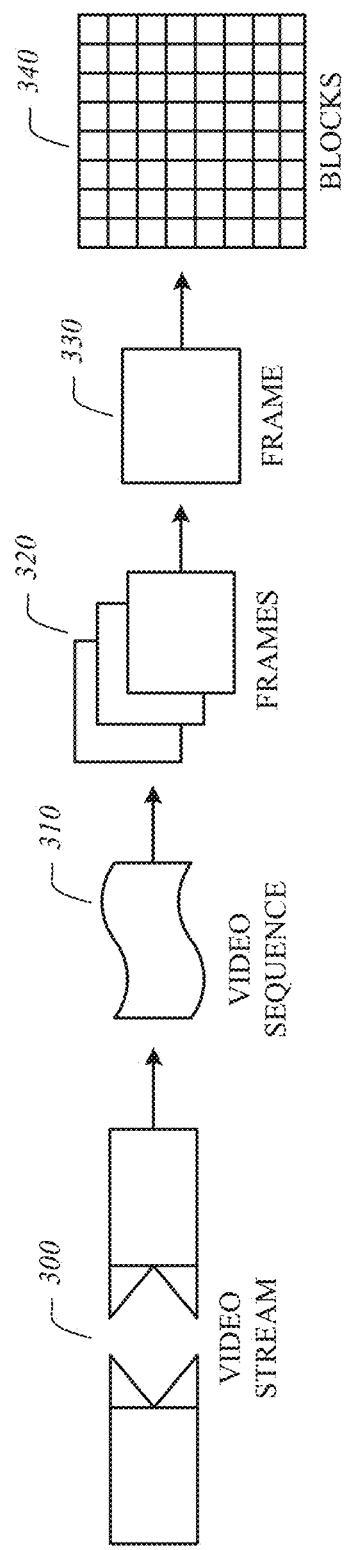
FIG. 3 is a diagram of a video stream for use in encoding and decoding in accordance with implementations of this disclosure.

FIG. 3 is a diagram of a video stream 300 for use in encoding and decoding in accordance with implementations of this disclosure. A video stream 300, such as a video stream captured by a video camera or a video stream generated by a computing device, may include a video sequence 310. The video sequence 310 may include a sequence of adjacent frames 320. Although three adjacent frames 320 are shown, the video sequence 310 can include any number of adjacent frames 320. Each frame 330 from the adjacent frames 320 may represent a single image from the video stream. A frame 330 may include blocks 340. Although not shown in FIG. 3, a block can include pixels. For example, a block can include a 16×16 group of pixels, an 8×8 group of pixels, an 8×16 group of pixels, or any other group of pixels. Unless otherwise indicated herein, the term 'block' can include a superblock, a macroblock, a segment, a slice, or any other portion of a frame. A frame, a block, a pixel, or a combination thereof can include display information, such as luminance information, chrominance information, or any other information that can be used to store, modify, communicate, or display the video stream or a portion thereof.

Figure 4:
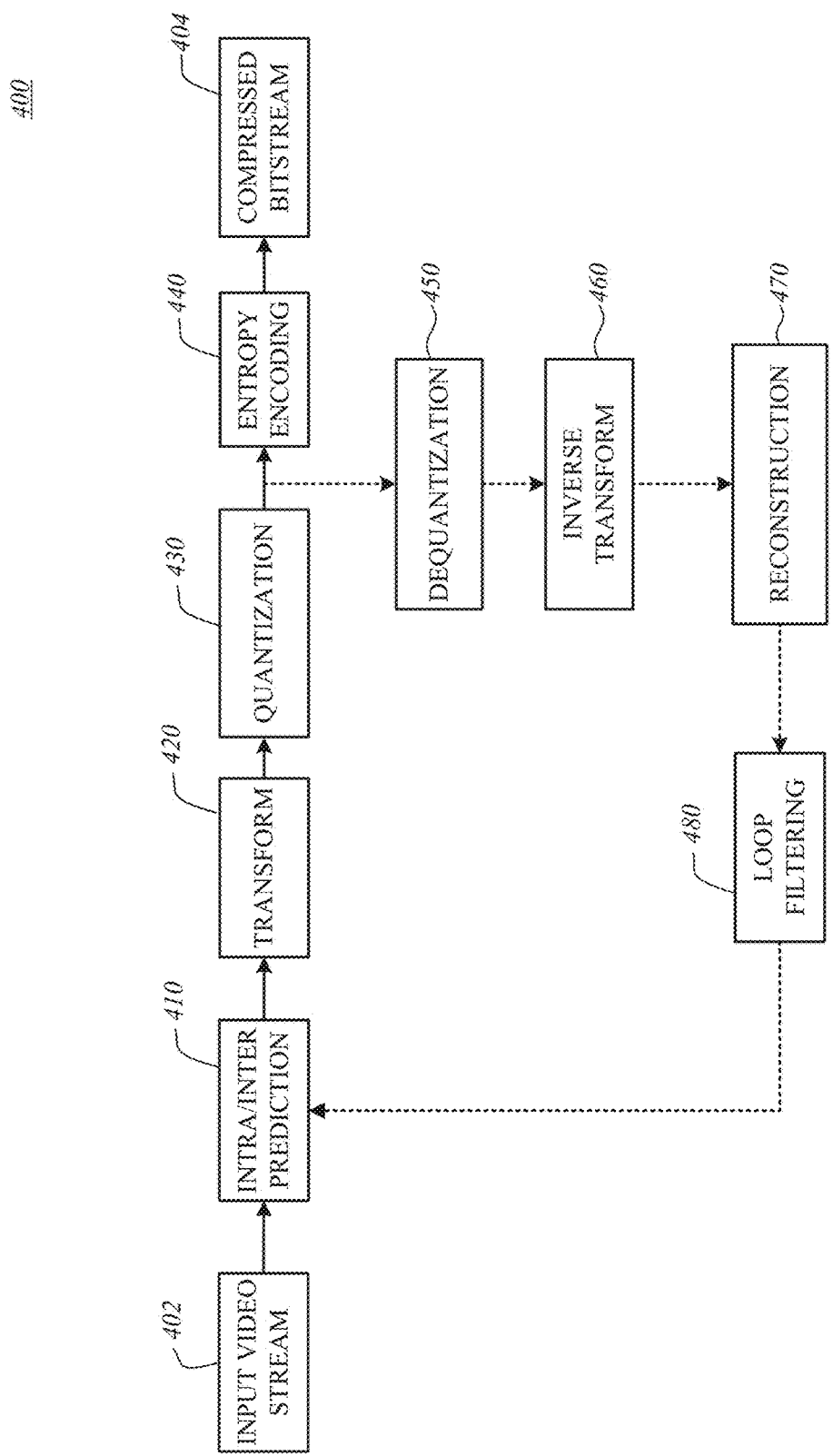
FIG. 4 is a block diagram of an encoder in accordance with implementations of this disclosure.

FIG. 4 is a block diagram of an encoder 400 in accordance with implementations of this disclosure. Encoder 400 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to encode video data as described herein. The encoder 400 can be implemented as specialized hardware included, for example, in computing device 100.

The encoder 400 can encode an input video stream 402, such as the video stream 300 shown in FIG. 3 to generate an encoded (compressed) bitstream 404. In some implementations, the encoder 400 may include a forward path for generating the compressed bitstream 404. The forward path may include an intra/inter-prediction unit 410, a transform unit 420, a quantization unit 430, an entropy encoding unit 440, or any combination thereof. In some implementations, the encoder 400 may include a reconstruction path (indicated by the broken connection lines) to reconstruct a frame for encoding of further blocks. The reconstruction path may include a dequantization unit 450, an inverse transform unit 460, a reconstruction unit 470, a loop filtering unit 480, or any combination thereof. Other structural variations of the encoder 400 can be used to encode the video stream 402.

For encoding the video stream 402, each frame within the video stream 402 can be processed in units of blocks. Thus, a current block may be identified from the blocks in a frame, and the current block may be encoded.

At the intra/inter-prediction unit 410, the current block can be encoded using either intra-frame prediction, which may be within a single frame, or inter-frame prediction, which may be from frame to frame. Intra-prediction may include generating a prediction block from samples in the current frame that have been previously encoded and reconstructed. Inter-prediction may include generating a prediction block from samples in one or more previously constructed reference frames. Generating a prediction block for a current block in a current frame may include performing motion estimation to generate a motion vector indicating an appropriate reference block in the reference frame.

The intra/inter-prediction unit 410 may subtract the prediction block from the current block (raw block) to produce a residual block. The transform unit 420 may perform a block-based transform, which may include transforming the residual block into transform coefficients in, for example, the frequency domain. Examples of block-based transforms include the Karhunen-Loève Transform (KLT), the Discrete Cosine Transform (DCT), and the Singular Value Decomposition Transform (SVD). In an example, the DCT may include transforming a block into the frequency domain. The DCT may include using transform coefficient values based on spatial frequency, with the lowest frequency (i.e. DC) coefficient at the top-left of the matrix and the highest frequency coefficient at the bottom-right of the matrix.

The quantization unit 430 may convert the transform coefficients into discrete quantum values, which may be referred to as quantized transform coefficients or quantization levels. The quantized transform coefficients can be entropy encoded by the entropy encoding unit 440 to produce entropy-encoded coefficients. Entropy encoding can include using a probability distribution metric. The entropy-encoded coefficients and information used to decode the block, which may include the type of prediction used, motion vectors, and quantizer values, can be output to the compressed bitstream 404. The compressed bitstream 404 can be formatted using various techniques, such as run-length encoding (RLE) and zero-run coding.

Figure 5:
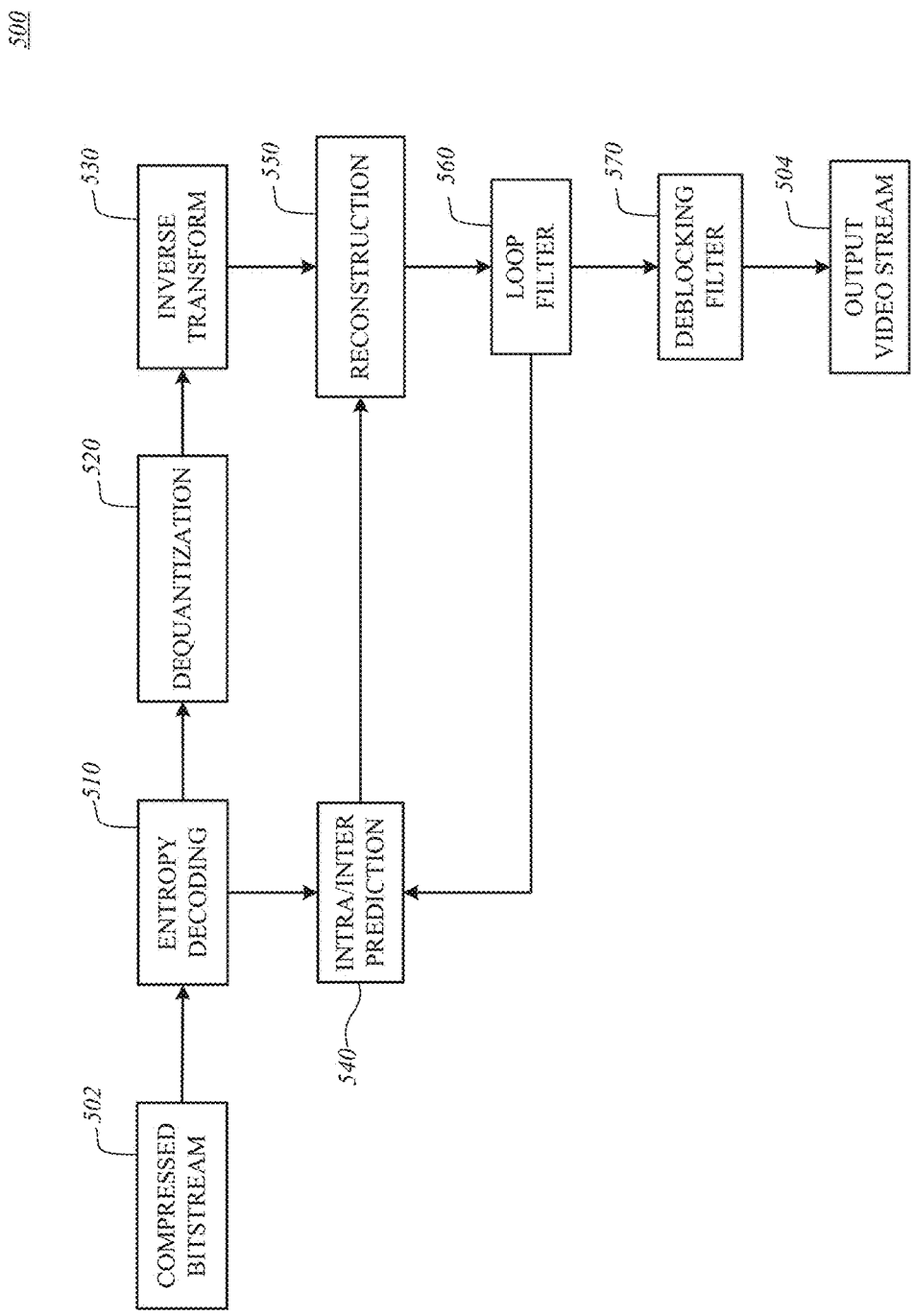
FIG. 5 is a block diagram of a decoder in accordance with implementations of this disclosure.

The reconstruction path can be used to maintain reference frame synchronization between the encoder 400 and a corresponding decoder, such as the decoder 500 shown in FIG. 5. The reconstruction path may be similar to the decoding process discussed below, and may include dequantizing the quantized transform coefficients at the dequantization unit 450 and inverse transforming the dequantized transform coefficients at the inverse transform unit 460 to produce a derivative residual block. The reconstruction unit 470 may add the prediction block generated by the intra/inter-prediction unit 410 to the derivative residual block to create a reconstructed block. The loop filtering unit 480 can be applied to the reconstructed block to reduce distortion, such as blocking artifacts.

Other variations of the encoder 400 can be used to encode the compressed bitstream 404. For example, a non-transform based encoder 400 can quantize the residual block directly without the transform unit 420. In some implementations, the quantization unit 430 and the dequantization unit 450 may be combined into a single unit.

FIG. 5 is a block diagram of a decoder 500 in accordance with implementations of this disclosure. The decoder 500 can be implemented in a device, such as the computing device 100 shown in FIG. 1 or the computing and communication devices 100A/100B/100C shown in FIG. 2, as, for example, a computer software program stored in a data storage unit, such as the memory 150 shown in FIG. 1. The computer software program can include machine instructions that may be executed by a processor, such as the processor 160 shown in FIG. 1, and may cause the device to decode video data as described herein. The decoder 400 can be implemented as specialized hardware included, for example, in computing device 100.

The decoder 500 may receive a compressed bitstream 502, such as the compressed bitstream 404 shown in FIG. 4, and may decode the compressed bitstream 502 to generate an output video stream 504. The decoder 500 may include an entropy decoding unit 510, a dequantization unit 520, an inverse transform unit 530, an intra/inter-prediction unit 540, a reconstruction unit 550, a loop filtering unit 560, a deblocking filtering unit 570, or any combination thereof. Other structural variations of the decoder 500 can be used to decode the compressed bitstream 502.

The entropy decoding unit 510 may decode data elements within the compressed bitstream 502 using, for example, Context Adaptive Binary Arithmetic Decoding, to produce a set of quantized transform coefficients. The dequantization unit 520 can dequantize the quantized transform coefficients, and the inverse transform unit 530 can inverse transform the dequantized transform coefficients to produce a derivative residual block, which may correspond with the derivative residual block generated by the inverse transformation unit 460 shown in FIG. 4. Using header information decoded from the compressed bitstream 502, the intra/inter-prediction unit 540 may generate a prediction block corresponding to the prediction block created in the encoder 400. At the reconstruction unit 550, the prediction block can be added to the derivative residual block to create a reconstructed block. The loop filtering unit 560 can be applied to the reconstructed block to reduce blocking artifacts. The deblocking filtering unit 570 can be applied to the reconstructed block to reduce blocking distortion, and the result may be output as the output video stream 504.

Other variations of the decoder 500 can be used to decode the compressed bitstream 502. For example, the decoder 500 can produce the output video stream 504 without the deblocking filtering unit 570.

In some implementations, reducing temporal redundancy may include using similarities between frames to encode a frame using a relatively small amount of data based on one or more reference frames, which may be previously encoded, decoded, and reconstructed frames of the video stream. For example, a block or pixel of a current frame may be similar to a spatially corresponding block or pixel of a reference frame. In some implementations, a block or pixel of a current frame may be similar to block or pixel of a reference frame at a different portion, and reducing temporal redundancy may include generating motion information indicating the spatial difference, or translation, between the location of the block or pixel in the current frame and corresponding location of the block or pixel in the reference frame.

In some implementations, reducing temporal redundancy may include identifying a block or pixel in a reference frame, or a portion of the reference frame, that corresponds with a current block or pixel of a current frame. For example, a reference frame, or a portion of a reference frame, which may be stored in memory, may be searched for the best block or pixel to use for encoding a current block or pixel of the current frame. For example, the search may identify the block of the reference frame for which the difference in pixel values between the reference block and the current block is minimized, and may be referred to as motion searching. In some implementations, the portion of the reference frame searched may be limited. For example, the portion of the reference frame searched, which may be referred to as the search area, may include a limited number of rows of the reference frame. In an example, identifying the reference block may include calculating a cost function, such as a sum of absolute differences (SAD), between the pixels of the blocks in the search area and the pixels of the current block. In some implementations, more than one reference frame may be provided. For example, three reference frames may be selected from eight candidate reference frames.

In some implementations, the spatial difference between the location of the reference block in the reference frame and the current block in the current frame may be represented as a motion vector. The difference in pixel values between the reference block and the current block may be referred to as differential data, residual data, or as a residual block. In some implementations, generating motion vectors may be referred to as motion estimation, a pixel of a current block may be indicated based on location using Cartesian coordinates as $f_{x,y}$. Similarly, a pixel of the search area of the reference frame may be indicated based on location using Cartesian coordinates as $r_{x,y}$. A motion vector (MV) for the current block may be determined based on, for example, a SAD between the pixels of the current frame and the corresponding pixels of the reference frame.

In some implementations, for inter-prediction, the encoder 400 may convey encoded information for prediction blocks at block end points, including but not limited to a prediction mode, the prediction reference frame(s), motion vector(s) if needed, subpixel interpolation filter type.

Figure 6:
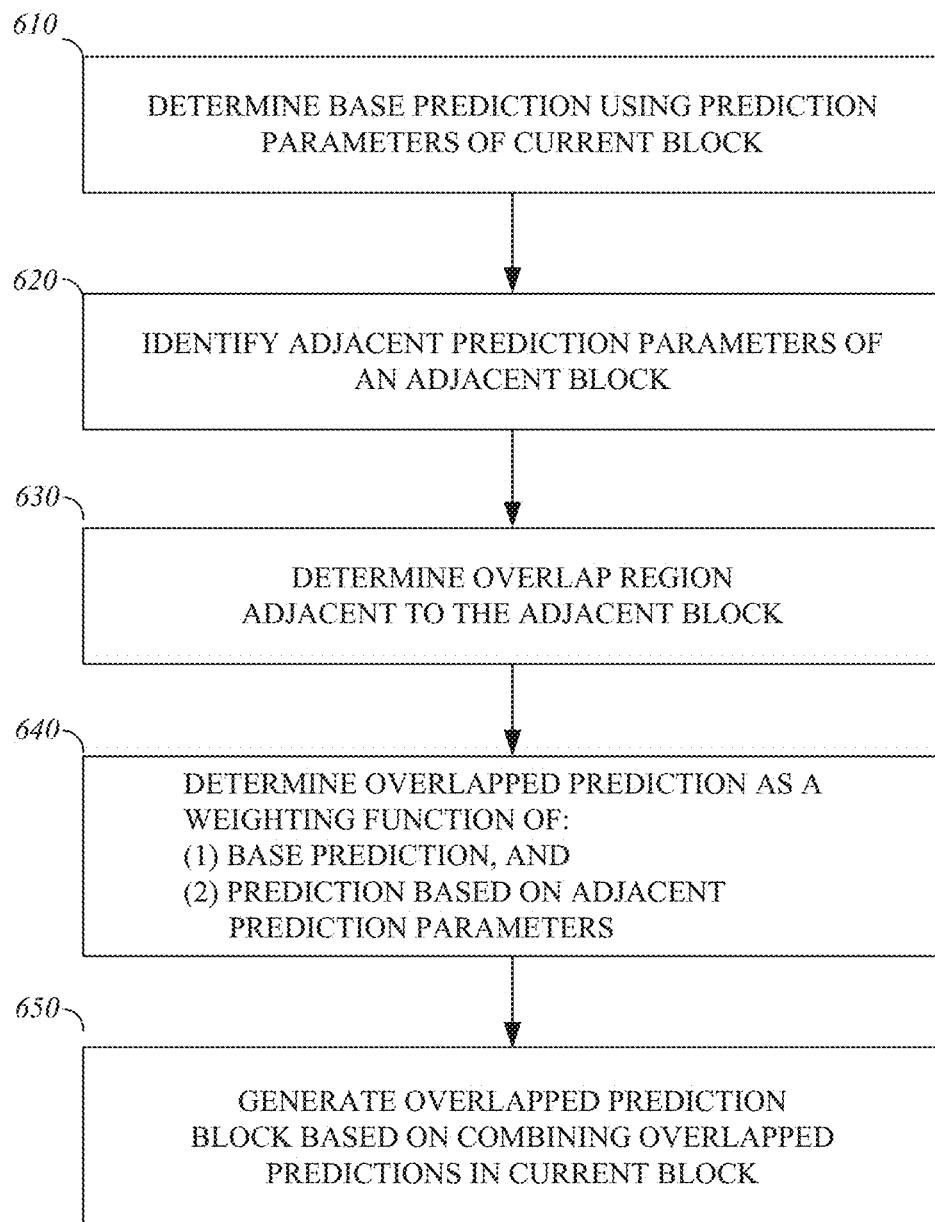
FIG. 6 is a flowchart diagram of an example process for adaptive overlapped block prediction in accordance with implementations of this disclosure.

FIG. 6 is a flowchart diagram of an example of a method for adaptive overlapped block prediction in accordance with implementations of this disclosure. Adaptive overlapped block prediction may be implemented in an encoder, such as a prediction performed by inter/intra prediction unit 410 of encoder 400 as shown in FIG. 4, or in a decoder, such as a prediction based on compressed bitstream 502 performed by inter/intra prediction unit 540 in decoder 500 shown in FIG. 5. In some implementations, adaptive overlapped block prediction may include determining a base prediction of the current block based on prediction parameters for the current block at 610, identifying adjacent prediction parameters of an adjacent block at 620, determining an overlap region adjacent to the adjacent block in the current block at 630, determining an overlapped prediction of the overlap region as a weighted function of the base prediction, and a prediction based on the adjacent prediction parameters at 640, generating an overlapped prediction block based on combining the overlapped predictions at 650, or a combination thereof.

A base prediction for the current block may be performed at 610 using current prediction parameters for the current block. For example, the prediction parameters for inter-prediction may include a reference frame and motion vectors of the current block. A base prediction block may be determined using the base prediction of the current block.

Adjacent prediction parameters may be identified at 620. In some implementations, identifying the adjacent prediction parameters may include identifying previously encoded or decoded adjacent blocks, and for each of the previously encoded or decoded adjacent blocks, identifying the prediction parameters used for encoding or decoding the adjacent block.

An overlap region may be determined at 630. In some implementations, an overlap region in the current block may be determined for one or more of the encoded or decoded adjacent blocks identified at 620. The overlap region may include a region, such as a grouping of pixels, within the current block that is adjacent to the corresponding adjacent block. The overlap region determination may be conditional on whether there is at least one previously encoded or decoded adjacent block smaller in size than the current block.

An overlapped prediction may be determined at 640. In some implementations, an overlapped prediction for the overlap region identified at 630 may be determined based on a weighted function of the base prediction determined at 610 and a prediction generated using the adjacent prediction parameters from the corresponding adjacent block to predict pixel values in the current block within the overlap region. For example, for an overlap region, a prediction block of a size equivalent to the size of the overlap region may be determined using the prediction parameters of the corresponding adjacent block. The overlapped prediction may be performed for the overlap region based on a weighted combination of a base prediction block pixel values and the prediction block pixel values generated for the overlap region based on the prediction parameters of the corresponding adjacent block. For example, the pixel value for a pixel in the overlap region may be a weighted average of the pixel value from the base prediction block and the corresponding pixel value from the prediction block generated for the overlap region based on the prediction parameters of the corresponding adjacent block. In some implementations, generating prediction blocks for the respective overlap regions may be omitted, and the overlapped prediction block may be generated on a pixel-by-pixel basis.

An overlapped prediction block may be generated using overlapped predictions from one or more adjacent blocks at 650. For example, the overlapped prediction at 640 may be repeated for one or more overlap region within the current block to form the overlapped prediction block.

In some implementations, a portion of the current block that does not correspond spatially with the overlap regions for the current block may be predicted based on the base prediction.

In some implementations, an overlapped prediction block for the current block may be compared to the base prediction block, and the base prediction or the overlapped prediction bock may be used as the prediction block for the current block. For example, the comparison may be based on residual-based error metric, and the encoder 400 may select the prediction block producing lower error values.

In some implementations, information that indicates that an overlapped prediction was performed on the current block may be included in the encoded bitstream. For example, an indication of a type of weighted function used for the overlapped prediction may be indicated in the encoded bitstream. In some implementations, an indication of the weighted function may be omitted from the encoded bitstream, and decoding the encoded bitstream may include determining a weighted function using context information of previously decoded adjacent frames. For example, decoding may include identifying a weighted function based on which adjacent block prediction parameters produce the smallest residual-based errors.

Figure 7:
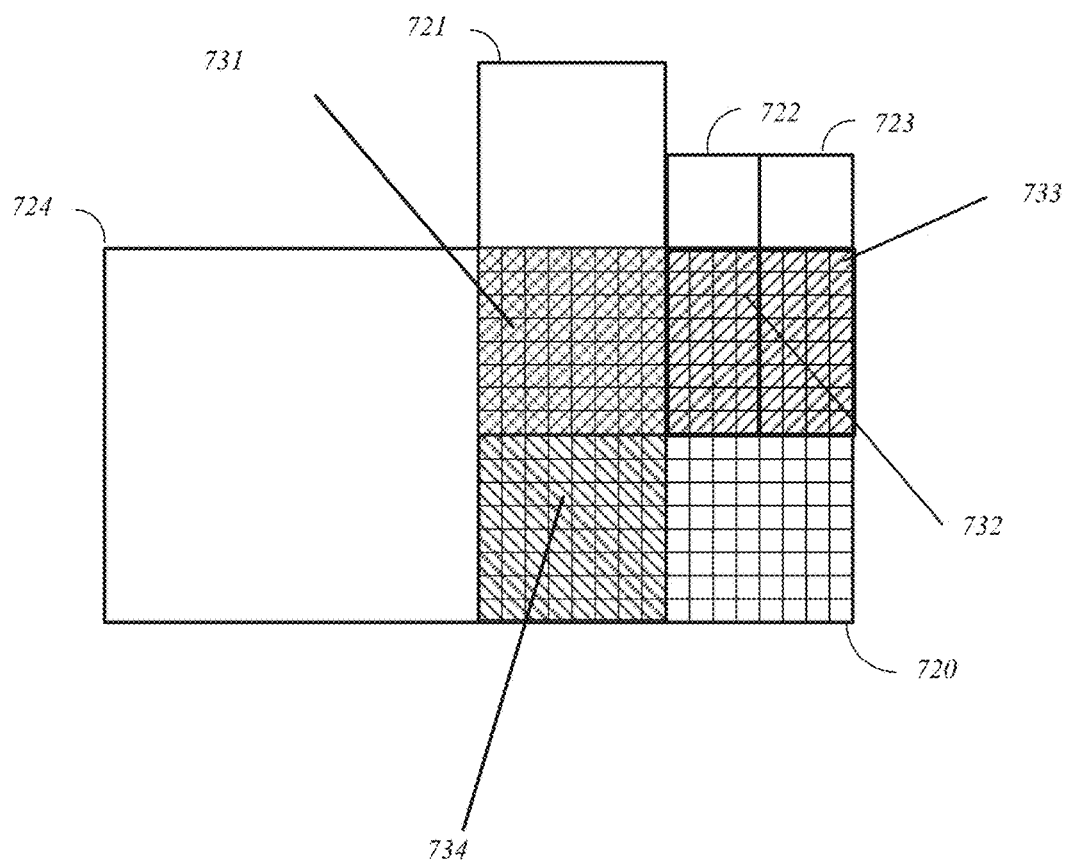
FIG. 7 is a block diagram of an example block based prediction with variable block sizes in accordance with implementations of this disclosure.

FIG. 7 is a block diagram of an example block based prediction with variable block sizes in accordance with implementations of this disclosure. In some implementations, at least one side of the current block may be adjacent to two or more previously encoded or decoded blocks. As shown, current block 720 for prediction is surrounded by previously encoded or decoded top adjacent blocks 721, 722, 723 and left adjacent block 724. Although the previously encoded or decoded adjacent blocks are shown in FIG. 7 to be above and to the left of current block 720, in some implementations, previously encoded or decoded adjacent blocks may be below or to the right of the current block, or some combination of top, left, bottom or right.

As shown in FIG. 7, current block 720 is a 16×16 block, adjacent block 721 is an 8×8 block, adjacent blocks 722, 723 are 4×4 blocks, and adjacent block 724 is a 16×16 block. Although 16×16, 8×8, and 4×4 blocks are shown in FIG. 7, any other block sizes are may be used in accordance with this disclosure.

In some implementations, an overlap region may be determined for the overlapped prediction of current block 720 with respect to one or more previously encoded or decoded adjacent blocks. For example, pixels in current block 720 may be grouped within defined overlap regions, where an overlap region may be determined for one or more top adjacent block, such as overlap regions 731, 732, and 733 corresponding to adjacent blocks 721, 722, and 733, respectively, and overlap region 734, shown as at the left half of current block 720, corresponding to left adjacent block 724. As shown in FIG. 7, overlap regions may overlap, such as overlap regions 731 and 734, where overlap region 731 includes an intersection of overlap regions corresponding to top adjacent block 721 and left adjacent block 724. As shown, the overlap regions 731-734 are within the current block 720 and are adjacent to respective corresponding adjacent blocks 721-724.

In some implementations, the weighted function for the overlapped prediction may determine the overlap region size. The size of the overlap region may correspond with the size of the corresponding adjacent block, such as a corresponding column dimension v, row dimension w, or both. In some implementations, a v×w overlap region size may correspond to an x×y adjacent block size, where v=x and w=y. For example, an overlap region such as an 8×8 overlap region 731 within current block 720, as shown in FIG. 7, may be determined with respect to 8×8 adjacent block 721.

The size of the overlap region may correspond with the size of the current block, such as such as a corresponding column dimension v, row dimension w, or both. In some implementations, a v×w overlap region size may correspond to an x'×y' current block size, where v=x' and w=y'. As an example, the current block may be smaller than an adjacent block, and the overlap region size for one dimension may be limited to the size of the current block at the boundary of the adjacent block. As another example, 4×8 overlap regions 732 and 733 as shown in FIG. 7 may be determined with respect to 4×4 adjacent blocks 722 and 733, respectively, and the number of rows corresponding to half of a 16×16 current block size dimension, where w=½ y'=8. In some implementations, a v×w overlap region size may correspond to an x'×y' current block size, where v=x'/2 and w=y'. For example, an 8×16 overlap region 734 may be determined with respect to 16×16 left adjacent block 724. In some implementations, the size of the overlap region may correspond with both the adjacent block size and the current block size. Other variants of overlap region sizes may be used.

In some implementations, a weighted function index that indicates which one of various discrete overlap region sizes is used as a common size for all overlap regions may be included in the encoded bitstream, decoding the block may include decoding the index to determine which of the discrete overlap region sizes to use for the overlapped prediction weighted function. As an example, a first index may indicate that all overlap regions have a size with a first dimension equal to the adjacent block edge length, and a second dimension that extends ½ the length of current block, such as overlap region 732 shown in FIG. 7. A second index may indicate that all overlap regions have a first dimension equal to the adjacent block edge, and a second dimension that extends ¼ the length of the current block, such as overlap region 904 shown in FIG. 8. In some implementations, encoding may include determining a weighted function that maps different relative sizes for each of the overlap regions, depending on prediction parameters for the adjacent blocks. For example, encoding may include generating multiple prediction block candidates according to various weighted functions, determining a rate distortion cost estimate for each candidate, and selecting the weighted function that provides the best rate distortion optimization.

Figure 8:
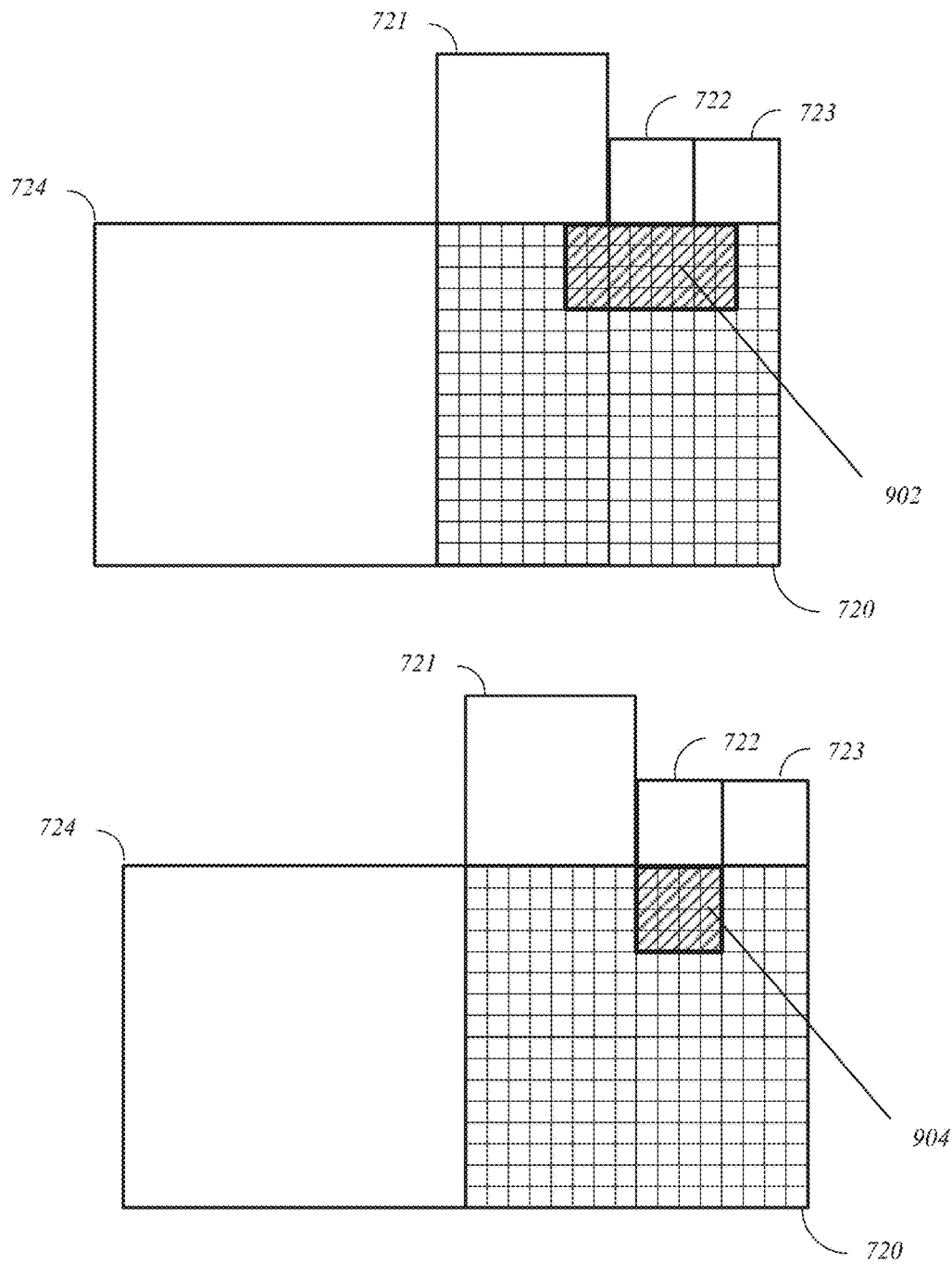
FIG. 8 is a block diagram of example size variations of overlap regions in accordance with implementations of this disclosure.

FIG. 8 is a block diagram of example size variations of overlap regions in accordance with implementations of this disclosure. In some implementations, a dimension of the overlap region may exceed a corresponding dimension of the corresponding adjacent block. For example, as shown in FIG. 8, overlap region 902 corresponding with adjacent block 722 may be determined having a horizontal size greater than the number of horizontal pixels in corresponding adjacent block 722, and equal in vertical size. As another example, overlap region 904 corresponding with adjacent block 722 may be determined according to the horizontal size of the adjacent block, and ¼ the vertical size of the current block. In some implementations, both horizontal and vertical dimensions of the overlap region may exceed corresponding dimensions of the corresponding adjacent block. In some implementations, both horizontal and vertical dimensions of the overlap region may be exceeded by corresponding dimensions of the corresponding adjacent block.

Various overlap region sizes may be determined by using a set of discrete sizing functions, from which the overlap region size may be adaptively selected as a function of a difference between prediction parameters of the current block and the adjacent prediction parameters of the corresponding adjacent block. In some implementations, a comparison between motion vectors of the current block and motion vectors of the corresponding adjacent block for the overlap region may indicate a motion vector difference that exceeds a threshold, and one or more dimensions of a default overlap region size may be adjusted. In some implementations, the determination of the difference of the prediction parameters between the adjacent block and the current block may be based on a comparison of the temporal distance between reference frames for the adjacent block and for the current block respectively. For example, the reference frame for the adjacent block may be the previously encoded frame and the reference frame for the current block may be a frame encoded prior to the previously encoded frame, and the difference may be measured by number of frames, or temporal distance, between the reference frames.

In some implementations, both the adjacent block and the current block may be predicted according to an inter-prediction, in which case overlap region sizing of the weighted function may be according to the above description. In some implementations, one of the adjacent block or the current block may be predicted according to an intra-prediction with the other being predicted according to an inter-prediction, thus a usable comparison of prediction parameters may not be available. When a comparison of prediction parameters is not available, the weighted function may define an overlap region size according to a predetermined function of current block size. For example, the overlap region size may be defined as a small overlap region, such as being based on ¼ of current block length. As another example, the size for the overlap region may be set to zero, or no overlap region, since the adjacent prediction may be considered too different from the current block prediction, and overlapped prediction can be omitted.

In some implementations, a defined overlap region size may range between (0,0), which may indicate no overlap region, and a x'×y', which may indicate the current block size. The weighted function for the overlapped prediction may adjust the defined overlap region size based on a difference between prediction parameters. For example, for an overlap region, such as the overlap region 732 shown in FIG. 7, motion vector values of adjacent block 722 may be very similar to motion vector values of the current block, such as current block 720 shown in FIG. 7, and there size adjustment to the defined overlap size may be omitted. As another example, the motion vector values of an adjacent block, such as adjacent block 722 shown in FIG. 7, may differ from motion vector values of a current block, such as the current block 720 shown in FIG. 7, the difference may exceed an established threshold, and the overlap region size may be adjusted. For example, the overlap region may be expanded as shown for overlap region 902, or may be contracted as shown for overlap region 904, as shown in FIG. 8. In some implementations, adapting the overlap region size based on differences between prediction parameters, may include adapting the weighted function of the overlapped prediction such that the weighting can be weighted to favor the contribution of the current block prediction parameters or the adjacent block prediction parameters depending on which prediction parameters optimize the overlapped prediction of the current block. For example, the weighted function may weight a contribution from the adjacent block prediction parameters to zero for some pixels in the current block by setting at least one dimension of the overlap region to be less than a corresponding dimension of the current block.

In some implementations, an overlap region may be omitted on a condition that the difference between prediction parameters of the current block and the adjacent block exceeds a threshold (i.e., the size of the overlap region is 0×0). In some implementations, an overlap region may be omitted on a condition that there is little or no difference between prediction parameters of the current block and the adjacent block. For example, the current block prediction may be substantially similar to the adjacent block prediction, the difference between prediction parameters may be less than a minimum threshold, and the size of the overlap region may be 0×0.

In some implementations, a base prediction may be determined for current block 720 using prediction parameters for current block 720. The base prediction may then be the base prediction for each overlap region 731-734. For example, a base prediction block may be determined for the entire current block, such that pixel values for the base prediction may be stored for later use when determining the overlapped prediction for each pixel in the overlap regions of the current block 720.

In some implementations, a prediction may be determined for each of the overlap regions, such as the overlap regions 731-734 shown in FIG. 7, based on prediction parameters of the adjacent block associated with the overlap region. For example, a prediction may be determined for the pixels in an overlap region, such as the overlap region 732 shown in FIG. 7, using prediction parameters that include corresponding reference frame and motion vectors for an adjacent block, such as adjacent block 722 shown in FIG. 7.

In some implementations, an overlapped prediction may be determined for one or more overlap region, such as the overlap regions 731-734 shown in FIG. 7, as a weighted function of the base prediction and predictions based on the respective adjacent prediction parameters. For example, the overlapped prediction for each pixel in overlap region, such as overlap region 732 shown in FIG. 7, may be an average of the base prediction value and the prediction pixel value generated based on the respective adjacent prediction parameters. In some implementations, there may be more than one overlap region for a pixel in the current block. For example, two or more adjacent overlap regions may overlap, such as overlap regions 731, 732, and 733 shown in FIG. 7 and the overlapped prediction may be determined as an average of the base prediction based on the prediction parameters for the current block, and n predictions based on the respective prediction parameters for each of the n adjacent blocks associated with the overlap regions. For example, referring to FIG. 7, pixels in both overlap region 731 and 734 correspond to two predictions based on the respective adjacent prediction parameters (i.e., n=2) which may be averaged with the base prediction to determine the overlapped prediction. In some implementations, each pixel in overlap region 731 may be determined as an average of a base prediction using prediction parameters of the current block 720, a prediction based on prediction parameters of the adjacent block 721, and a prediction based on prediction parameters of the adjacent block 724.

In some implementations, the weighted function for overlapped prediction may be a function of distance between the center of the current block and the center of an adjacent block associated with the overlap region. For example, the weighted function may determine an overlapped prediction that favors smaller sized adjacent blocks, which may include pixels located, on average, closer to the current block than larger adjacent blocks, may be more reliable, and to provide a better prediction of the current block. For example, the weighted function may weight overlap region 732 to contribute more heavily to the overlapped prediction of current block 720 than larger overlap region 734, as the center of adjacent block 722 is closer to the center of current block 720 compared to the center of adjacent block 724.

Figure 9:
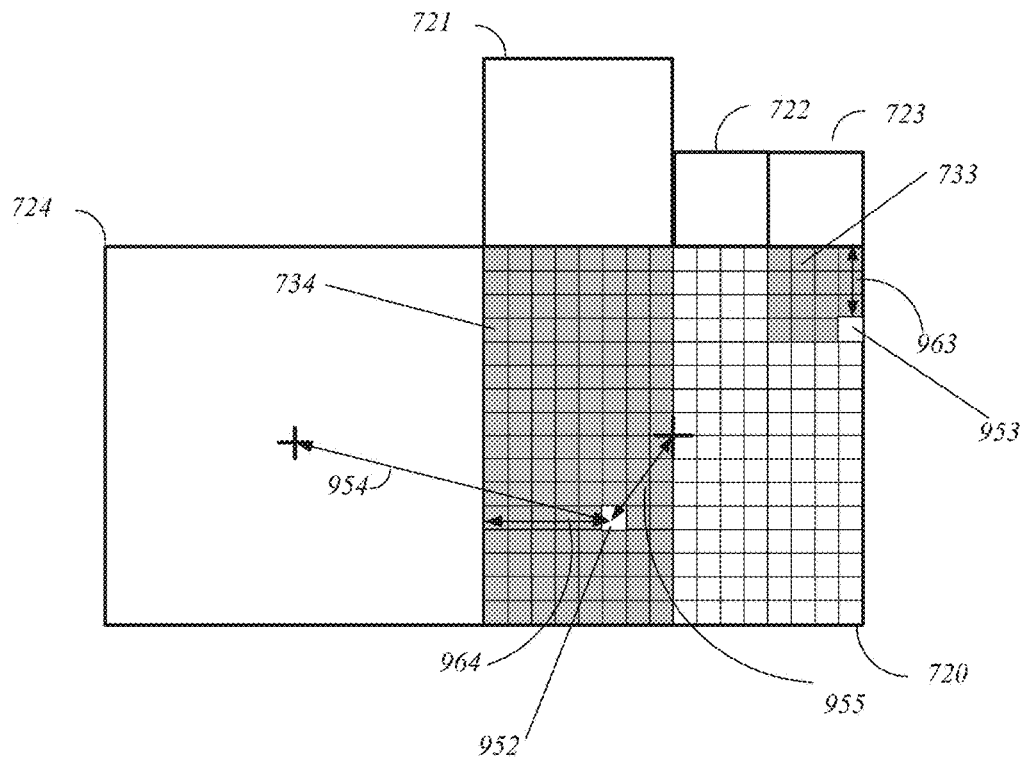
FIG. 9 is a block diagram of an example weighted function for overlapped prediction in accordance with implementations of this disclosure.

FIG. 9 is a block diagram of an example weighted function for overlapped prediction in accordance with implementations of this disclosure. The overlapped prediction may be optimized by a weighted average of the first prediction and the n adjacent block-based predictions. For example, $P_0$ may indicate the prediction using current block prediction parameters, $\omega_0$ may indicate the weight for prediction $P_0$, $P_n$ may indicate the prediction using adjacent block prediction parameters, $\omega_n$ may indicate the weight for prediction $P_n$, and weighting of the overlapped prediction OP of pixel 952 may be expressed as the following:

$$OP = \frac{1}{N+1}\left(\omega_0 P_0 + \sum_{n=1}^{N} \omega_n P_n\right). \qquad \text{Equation (1)}$$

In some implementations, one or more predicted pixel value at each pixel in an overlap region may be weighted according to a weighted function based on the relative pixel position with respect to the adjacent block associated with the overlap region. For example, the overlapped prediction may be weighted such that a contribution by the prediction based on adjacent block prediction parameters is greater when the pixel is located relatively nearer to the adjacent block. For example, pixel 952 in overlap region 734 shown in FIG. 9 has a relative distance 954 to the center of corresponding adjacent block 724 and a relative distance 955 to the center of current block 720. In some implementations, overlapped prediction weights $\omega_0$, $\omega_n$ may be a function of relative distances 954, 955. For example, $d_0$ may indicate the relative distance from pixel to center of current block, $d_n$ may indicate the relative distance from pixel to center of adjacent block n, and the weighted function may be a proportion of relative distance values, which may be expressed as follows:

$$\omega_0 = \frac{d_0}{d_0 + d_n}. \qquad \text{Equation (2)}$$

$$\omega_n = \frac{d_n}{d_0 + d_n}. \qquad \text{Equation (3)}$$

In some implementations, overlapped prediction weights $\omega_0$, $\omega_n$ may be a function of a directional relative distance between the pixel and the boundary between the adjacent block and the current block, such as horizontal relative distance 964 for left adjacent block 724. For example, the weighted function may be based on a raised cosine window function in which weights $\omega_0$, $\omega_n$ are equal for a pixel located at the adjacent edge of overlap region n, and weights are $\omega_0=1$, $\omega_n=0$ for a pixel located at the edge of the overlap region farthest from adjacent block n. As another example, overlapped prediction weights $\omega_0$, $\omega_n$ may be a function of a vertical relative distance between the pixel and the nearest edge of the adjacent block, such as vertical relative distance 963 for pixel 953 with respect to top adjacent block 723.

In some implementations, the type of weighted function used for the overlapped prediction be encoded with an index, such as by encoder 400 shown in FIG. 4, and included in the compressed video bitstream, such as the compressed video bitstream 404 shown in FIG. 4, as an indication for decoding, such as by the decoder 500 shown in FIG. 5, of which weighted function to use for overlapped prediction. For example, various raised cosine weightings may be mapped to a first set of indexes, and various weighted functions based on relative distance to block center points may be mapped to a second set of indexes.

The weighted function for overlapped prediction may be a combination of any or all weighted functions described in this disclosure. For example, the weighted function may be implemented to weight the overlapped prediction by adaptive adjustment of overlap region size, by weighting each of the base prediction and overlapped predictions for the current block, or a combination thereof.

The words "example" or "exemplary" are used herein to mean serving as an example, instance, or illustration. Any aspect or design described herein as "example" or "exemplary" not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. As used herein, the terms "determine" and "identify", or any variations thereof, includes selecting, ascertaining, computing, looking up, receiving, determining, establishing, obtaining, or otherwise identifying or determining in any manner whatsoever using one or more of the devices shown in FIG. 1.

Further, for simplicity of explanation, although the figures and descriptions herein may include sequences or series of steps or stages, elements of the methods disclosed herein can occur in various orders and/or concurrently. Additionally, elements of the methods disclosed herein may occur with other elements not explicitly presented and described herein. Furthermore, not all elements of the methods described herein may be required to implement a method in accordance with the disclosed subject matter.

The implementations of the transmitting station 100A and/or the receiving station 100B (and the algorithms, methods, instructions, etc. stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably. Further, portions of the transmitting station 100A and the receiving station 100B do not necessarily have to be implemented in the same manner.

Further, in one implementation, for example, the transmitting station 100A or the receiving station 100B can be implemented using a computer program that, when executed, carries out any of the respective methods, algorithms and/or instructions described herein. In addition or alternatively, for example, a special purpose computer/ processor can be utilized which can contain specialized hardware for carrying out any of the methods, algorithms, or instructions described herein.

The transmitting station 100A and receiving station 100B can, for example, be implemented on computers in a real-time video system. Alternatively, the transmitting station 100A can be implemented on a server and the receiving station 100B can be implemented on a device separate from the server, such as a hand-held communications device. In this instance, the transmitting station 100A can encode content using an encoder 400 into an encoded video signal and transmit the encoded video signal to the communications device. In turn, the communications device can then decode the encoded video signal using a decoder 500. Alternatively, the communications device can decode content stored locally on the communications device, for example, content that was not transmitted by the transmitting station 100A. Other suitable transmitting station 100A and receiving station 100B implementation schemes are available. For example, the receiving station 100B can be a generally stationary personal computer rather than a portable communications device and/or a device including an encoder 400 may also include a decoder 500.

Further, all or a portion of implementations can take the form of a computer program product accessible from, for example, a tangible computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described implementations have been described in order to allow easy understanding of the application are not limiting. On the contrary, the application covers various modifications and equivalent arrangements included within the scope of the appended claims, which scope is to be accorded the broadest interpretation so as to encompass all such modifications and equivalent structure as is permitted under the law.

What is claimed is:

1. A method of encoding frames of a video stream, comprising:
   encoding by a processor in response to instructions stored on a non-transitory computer readable medium, a current block of a current frame, the encoding comprising:
      generating a base prediction block for the current block based on current prediction parameters associated with the current block;
      identifying adjacent prediction parameters used for encoding previously encoded adjacent blocks that are adjacent to the current block, wherein at least one side of the current block is adjacent to two or more of the previously encoded adjacent blocks;
      determining overlap regions in the current block, wherein each of the overlap regions corresponds to a respective previously encoded adjacent block, a first previously encoded adjacent block and a second previously encoded adjacent block of the two or more of the previously encoded adjacent blocks have the same size, and a size of an overlap region of the first previously encoded adjacent block is based on a comparison of the current prediction parameters and the adjacent prediction parameters of the first previously encoded adjacent block and a size of an overlap region of the second previously encoded adjacent block is based on a comparison of the current prediction parameters and the adjacent prediction parameters of the second previously encoded adjacent block such that the overlap region of the first previously encoded adjacent block and the overlap region of the second previously encoded adjacent block are of different sizes;
      generating an overlapped prediction of pixel values for each of the overlap regions according to a weighted function of the base prediction and a prediction based on the adjacent prediction parameters,
      encoding an index indicating an overlapped prediction for the current block, wherein the index includes information for weighted function type, including at least one of a proportion for relative distance of a pixel to a center point of the current block and a center point of the adjacent block, or a raised cosine window function for relative distance of the pixel to the adjacent block.

2. The method of claim 1, further comprising:
   identifying adjacent prediction parameters used for encoding a plurality of previously encoded adjacent blocks of variable sizes;
   for each previously encoded adjacent block, determining an overlap region within the current block and adjacent to the adjacent block, the overlap region having a size corresponding with the size of the current block and the adjacent block.

3. The method of claim 1, further comprising determining weights for the weighted function as a function of distance between each respective pixel and a boundary between the current block and the adjacent block.

4. The method of claim 1, further comprising determining weights for the weighted function as a function of distance between each respective pixel and the center of the current block, and distance between each respective pixel and the center of the adjacent block.

5. The method of claim 1, further comprising:
   generating overlapped predictions for each previously encoded adjacent block using at least two discrete overlap region sizes;
   determining a rate distortion cost for each of the overlapped predictions;
   selecting an overlap region size for all overlapped predictions based on rate distortion cost optimization;
   encoding a weighted function index that indicates the selected overlap region size.

6. The method of claim 1, further comprising:
   generating an overlapped prediction block based on all overlap predictions in the current block; and
   selecting a prediction block for the current block as one of the base prediction block or the overlapped prediction block based on which produces the lower residual values.

7. A method, comprising:
   encoding a current block in a current frame of a video stream, comprising:
   generating overlapped predictions for each previously encoded adjacent block using at least two discrete overlap region sizes, including:
      determining a first overlap region within the current block and adjacent to a previously encoded first adjacent block, wherein at least one side of the current block is adjacent to two or more previously encoded adjacent blocks; and
      generating an overlapped prediction of pixel values in the first overlap region as a weighted function of:

a first prediction using first prediction parameters of the current frame, and a second prediction using second prediction parameters of the first adjacent block;

determining a rate distortion cost for each of the overlapped predictions;

selecting an overlap region size for all overlapped predictions based on rate distortion cost optimization; and encoding a weighted function index that indicates the selected overlap region size, wherein the weighted function is adaptable by a function of a difference between the first prediction parameters and the second prediction parameters, and the weighted function is defined such that, when the first prediction parameters and the first adjacent block are unchanged, the weighted function results in a first overlapped prediction for the first overlap region when the second prediction parameters have first values and the weighted function results in a second overlapped prediction for the first overlap region when the second prediction parameters have second values different from the first values.

8. The method of claim 7, wherein the first prediction parameters include motion vectors corresponding to a reference frame for the current frame, and the second prediction parameters include motion vectors used for prediction of the first adjacent block, and the difference is based on motion vector values.

9. The method of claim 7, wherein the function of a difference is based on temporal distance between a reference frame of the current block and a reference frame of the first adjacent block.

10. The method of claim 7, further comprising:

defining a second overlap region within the current block and adjacent to a second adjacent block, the second overlap region having a size corresponding with a size of the second adjacent block, wherein the second adjacent block is encoded with third prediction parameters; and generating a prediction of the second overlap region as a function of the first prediction and a third prediction using the third prediction parameters from the second adjacent block.

11. The method of claim 10, wherein at least a portion of the first overlap region overlaps at least a portion of the second overlap region to form a fourth overlap region, the method further comprising:

generating a prediction of the fourth overlap region as a function of the first prediction, the second prediction using the second prediction parameters from the adjacent block, and the third prediction using third prediction parameters from the second adjacent block.

12. A method of encoding a current block of a current frame in a plurality of frames of a video stream, comprising:

generating a first prediction block of pixel values in the current block based on a first prediction using first prediction parameters;

defining an overlap region within the current block and adjacent to an adjacent block among a plurality of previously encoded blocks having variable block sizes, wherein at least one side of the current block is adjacent to two or more of the previously encoded blocks;

generating an updated prediction of pixel values for pixels within the overlap region, the updated prediction being a weighted function of the first prediction and a second prediction, the second prediction being based on second prediction parameters, wherein the weighted function is adaptable by a function of a difference between the first prediction parameters and the second prediction parameters such that when the first prediction parameters and the second prediction parameters indicate that one of the current block or the adjacent block is intra-predicted, the weighted function defines a size of the overlap region according to a predetermined function of a size of the current block, and such that when the first prediction parameters and the second prediction parameters indicate that each of the current block and the adjacent block is inter-predicted, the weighted function defines the size of the overlap region based on comparing the first prediction parameters and the second prediction parameters; and encoding an index indicating a type of the weighted function used for the overlapped prediction, wherein the index indicates one of a raised cosine window function or a weighted function based on relative distance to block center points of the current block and the adjacent block.

13. The method of claim 12, further comprising weighting the updated prediction in such a way that contribution by the second prediction is greater when the pixel is located relatively nearer to the adjacent block.

14. The method of claim 12, further comprising:

generating an overlapped prediction block based on a plurality of updated predictions in the current block corresponding to overlap regions defined for previously encoded top adjacent blocks and previously encoded left adjacent blocks; and generating a prediction block for the current block as one of the first prediction block or the overlapped prediction block based on which produces the lower residual values.

15. The method of claim 12, wherein the weighted function includes weights for the first prediction and the second prediction, the weights being determined as a function of distance between each respective pixel and a boundary between the current block and the adjacent block.

16. The method of claim 12, wherein weights for the pixel values of the first prediction are determined as a function of distance between each respective pixel and center of the current block, and weights for each of the pixel values of the second prediction are determined as a function of distance between each respective pixel and the center of the adjacent block.

* * * * *